US012611611B1

(12) United States Patent
Huang

(10) Patent No.: US 12,611,611 B1
(45) Date of Patent: Apr. 28, 2026

(54) CONNECTING STRUCTURE FOR ASSEMBLED TOY

(71) Applicant: Han Huang, Shantou (CN)

(72) Inventor: Han Huang, Shantou (CN)

( * ) Notice: Subject to any disclaimer, the term of this patent is extended or adjusted under 35 U.S.C. 154(b) by 0 days.

(21) Appl. No.: 19/356,063

(22) Filed: Oct. 11, 2025

(30) Foreign Application Priority Data

Sep. 1, 2025 (CN) .......................... 202521879501.1

(51) Int. Cl.
*A63H 33/08* (2006.01)
*A63H 33/06* (2006.01)
*F16B 17/00* (2006.01)

(52) U.S. Cl.
CPC ......... *A63H 33/067* (2013.01); *A63H 33/086* (2013.01); *F16B 17/00* (2013.01)

(58) Field of Classification Search
CPC .... A63H 33/06; A63H 33/062; A63H 33/067; A63H 33/088; F16B 2/00; F16B 17/00
See application file for complete search history.

(56) References Cited

U.S. PATENT DOCUMENTS

| | | | | | |
|---|---|---|---|---|---|
| 1,918,583 | A | * | 7/1933 | Bear ....................... | A01K 87/08 |
| | | | | | 43/18.1 R |
| 4,407,603 | A | * | 10/1983 | Lundgren ............... | F16D 1/094 |
| | | | | | 403/370 |
| 5,110,315 | A | * | 5/1992 | Zawitz ................... | A47B 65/00 |
| | | | | | 446/121 |

| | | | | | |
|---|---|---|---|---|---|
| 5,253,948 | A | * | 10/1993 | Butler ...................... | B25G 3/28 |
| | | | | | 403/348 |
| 5,284,401 | A | * | 2/1994 | Harley ................ | F16B 12/2036 |
| | | | | | 403/231 |
| 7,223,045 | B2 | * | 5/2007 | Migli ................... | F16B 12/2009 |
| | | | | | 403/231 |
| 9,345,983 | B2 | * | 5/2016 | Meys .................... | A63H 33/101 |
| D937,937 | S | * | 12/2021 | Nevgi .................. | A63H 33/062 |
| | | | | | D21/499 |
| 11,633,674 | B2 | * | 4/2023 | Nevgi .................. | A63H 33/086 |
| | | | | | 446/120 |
| 2009/0232595 | A1 | * | 9/2009 | Willemstyn ........... | F16J 15/061 |
| | | | | | 285/27 |
| 2015/0043967 | A1 | * | 2/2015 | Nakamura ......... | B65D 21/0231 |
| | | | | | 403/343 |
| 2016/0346708 | A1 | * | 12/2016 | Yim ...................... | A63H 33/088 |
| 2018/0250605 | A1 | * | 9/2018 | Park ..................... | A63H 17/264 |

* cited by examiner

*Primary Examiner* — John A Ricci
(74) *Attorney, Agent, or Firm* — RAYCHAN PATENT FIRM; Raymond Y Chan

(57) ABSTRACT

A connecting structure for an assembled toy includes a first connector and a second connector. The first connector is provided with a protruding structure, a first wavy step being formed on an outer surface of the protruding structure. The second connector is provided with a recessed structure, a second wavy step mating with the first wavy step being provided on an inner surface of the recessed structure. The protruding structure and the recessed structure mate with and are locked to each other to achieve a detachable connection between the first connector and the second connector. When the first connector is rotated relative to the second connector, the first wavy step and the second wavy step generate an interaction force to release the locking of the protruding structure and the recessed structure, so the first connector and the second connector are separated from each other.

10 Claims, 5 Drawing Sheets

A-A

CONNECTING STRUCTURE FOR ASSEMBLED TOY

CROSS REFERENCE OF RELATED APPLICATION

This application is a non-provisional application that claims the benefit of priority under 35 U.S.C. § 119 to a Chinese application number 202521879501.1, filed Sep. 1, 2025, which is incorporated herewith by reference in its entirety.

BACKGROUND OF THE PRESENT INVENTION

Field of Invention

The present application relates to the field of toys, and more particularly to an assembled toy.

Description of Related Arts

An assembled toy is composed of a variety of universal members that can inspire children's creativity and can be assembled into a variety of shapes. However, existing products generally have significant defects in terms of connecting structures: some products use a simple interference-fit connection, and an excessive torque is required to disassemble, which is laborious for children whose strength is not yet fully developed; and some products are designed with complex locking mechanisms in pursuit of connection stability, forcing users to perform specific unlocking steps before disassembly, which not only increases operation difficulty but also significantly diminishes the core enjoyment and playability of the toys.

SUMMARY OF THE PRESENT INVENTION

The present application aims to solve the technical problems in the prior art by providing a connecting structure for an assembled toy, including a first connector and a second connector, where the first connector is provided with a protruding structure, a first wavy step being formed on an outer surface of the protruding structure; and the second connector is provided with a recessed structure, a second wavy step mating with the first wavy step being formed on an inner surface of the recessed structure; where the protruding structure and the recessed structure mate with and are locked to each other to achieve a detachable connection between the first connector and the second connector, when the first connector is rotated relative to the second connector, the first wavy step and the second wavy step generate an interaction force to release the locking of the protruding structure and the recessed structure, such that the first connector and the second connector are separated from each other.

Further, the first wavy step and the second wavy step have peaks and troughs and slopes between the peaks and the troughs, respectively, each of the slopes having an angle of 30° to 60°.

Further, there is a smooth surface transition between each of the peaks and each of the troughs.

Further, the first wavy step is uniformly distributed along a circumference of the outer surface of the protruding structure, forming a continuous wavy structure; and the second wavy step is uniformly distributed along a circumference of the inner surface of the recessed structure, forming a continuous wavy structure.

Further, the first wavy step and the second wavy step has equal thicknesses in a horizontal direction, such that a contact surface of the first wavy step completely fits with a contact surface of the second wavy step when the first wavy step mates with the second wavy step.

Further, a recess is provided at the top of the protruding structure corresponding to an axial direction, at least two split fins extending inwardly from the recess; and a protrusion mating with the recess is provided at the bottom of the recessed structure corresponding to the axial direction, a boss is provided on an outer side of the protrusion, and the boss is engaged with the fins such that the first connector and the second connector are fixed to each other.

Further, ends of the at least two fins away from the recess are gathered close to each other, and the boss causes the fins to deform and move away from each other when the protrusion is inserted into the recess; and when the boss passes over the fins, the fins return to their original shapes, and edges of the fins are engaged with the boss.

Further, a head of the protrusion is provided with a guide bevel.

Further, a head of the protrusion is provided with a notch, and the notch becomes smaller and the protrusion deforms toward an axial center when the notch is subjected to a compressive force.

Further, the first connector and the second connector are made of plastic material.

According to the present invention, based on the design of the wavy steps mating with each other on the protruding structure and the recessed structure, the connecting structure effectively overcomes the defects of laborious assembly and disassembly for conventional interference-fit connections and of cumbersome operations of a complex locking mechanism. A stable connection can be achieved by direct insertion, ensuring the reliability of an assembled model. Separation operations are carried out by means of rotation. By means of the guiding of the slopes of the wavy steps, children can carry out disassembly easily, and operation difficulty and requirements for a physical force are lowered significantly. The structure can be operated intuitively and easily, which greatly enhances the playability and enjoyment of the toy while ensuring the connection strength.

The foregoing overview is intended only to explain the description and is not to be construed as limiting. In addition to the schematic aspects, embodiments, and features described above, further aspects, embodiments, and features will become apparent by reference to the drawings and the following detailed description.

BRIEF DESCRIPTION OF THE DRAWINGS

In the drawings, unless otherwise specified, the same reference numerals across multiple drawings denote the same or similar parts or elements. These drawings are not necessarily drawn to scale. It should be understood that the drawings merely depict certain embodiments disclosed in the present invention and are not to be construed as limiting the scope of the present invention.

LIST OF REFERENCE NUMBERS

Figure 1:
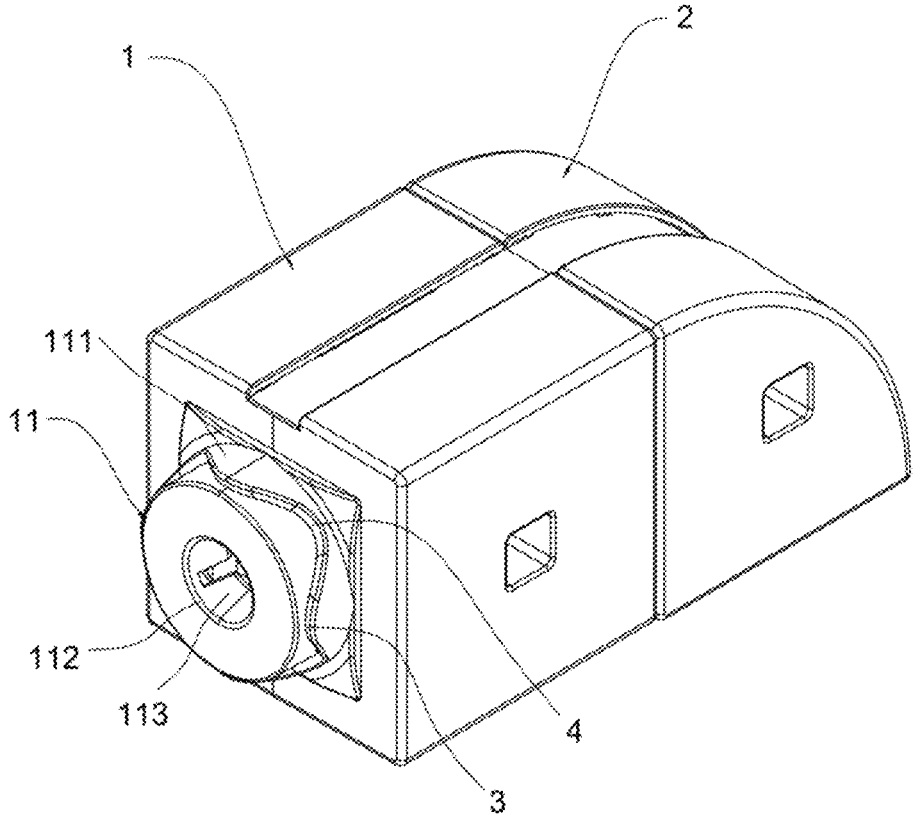
FIG. 1 shows a perspective view of an assembled toy according to the present application in one assembled state.
Figure 2:
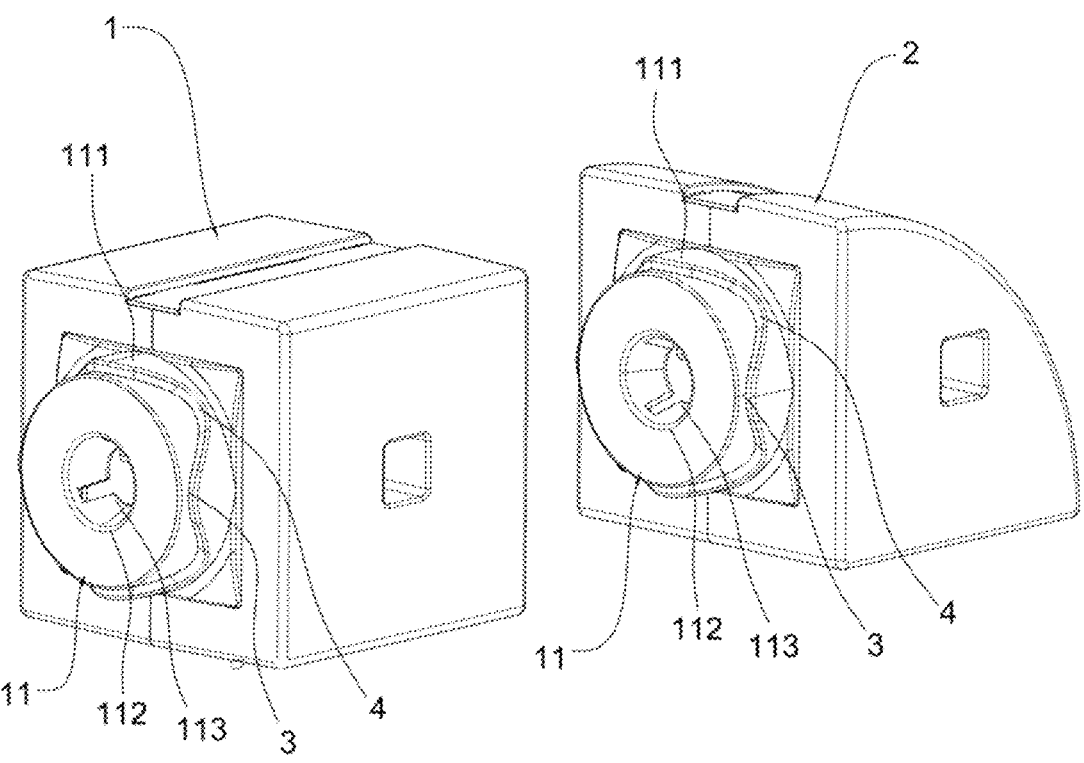
FIG. 2 shows a perspective view of the assembled toy shown in FIG. 1 in a separated state.

1, first connector; 11, protruding structure; 111, first wavy step; 112, recess; 113, fin; 2, second connector; 21, recessed structure; 211, second wavy step; 212, protrusion; 2121. boss; 2122, guide bevel; 2123, notch; 3, peak; 4, trough; 5, slope.

DETAILED DESCRIPTION OF THE PREFERRED EMBODIMENT

The following discloses multiple embodiments of the technical solutions of the present invention. To simplify the disclosure, specific examples of elements and arrangements are described. These are merely examples and do not limit the scope of protection of the present invention. For example, where the specification describes that a first feature is formed "above" or "on" a second feature, it may include embodiments where the first and second features are directly connected, as well as embodiments where additional features intervene. Similarly, repeated use of reference numerals across examples is for brevity and clarity only and does not imply any relationship between embodiments. Furthermore, when an element is described as being "connected" or "coupled" to another element, this includes both direct and indirect connections or couplings through one or more intermediate elements.

The following only briefly describes certain exemplary embodiments. As those skilled in the art will recognize, various modifications may be made to the embodiments described without departing from the spirit or scope of the present invention. Therefore, the drawings and description are regarded as illustrative rather than restrictive.

With reference to FIGS. 1 to 4, a connecting structure for an assembled toy in this embodiment includes a first connector 1 and a second connector 2, where the first connector 1 is provided with a protruding structure 11, and a first wavy step 111 is formed on an outer surface of the protruding structure 11; and the second connector 2 is provided with a recessed structure 21, where a second wavy step 211 mating with the first wavy step 111 is formed on an inner surface of the recessed structure 21; where the protruding structure 11 and the recessed structure 21 mate with and are locked to each other to achieve a detachable connection between the first connector 1 and the second connector 2, when the first connector 1 is rotated relative to the second connector 2, the first wavy step 111 and the second wavy step 211 generate an interaction force to release the locking of the protruding structure 11 and the recessed structure 21, such that the first connector 1 and the second connector 2 are separated from each other.

The protruding structure 11 may mate with the recessed structure 21 by means of interference-fit, and the first connector 1 and the second connector 2 are connected to each other by means of mutual frictions generated between the two structures. The protruding structure 11 may also mate with the recessed structure 21 by means of engagement connection. When it is necessary to separate the first connector 1 from the second connector 2, a user grasps the first connector 1 and the second connector 2 with both hands, respectively, rotates one of the connectors or rotates the two connectors in opposite directions. At this point, the first wavy step 111 and the second wavy step 211 counteract each other, such that the first connector 1 is separated from the second connector 2 along the wavy trend. The wavy steps can decompose a tangential force input during hand rotation into radial and axial components, allowing the protruding structure 11 and the recessed structure 21 to be separated and pushed apart from each other. With the structures in this embodiment, the first connector 1 and the second connector 2 can be connected firmly, and can also be separated from each other effortlessly. It can be understood that the first connector 1 and the second connector 2 are merely examples, there may be a plurality of connectors, each of the connectors may have only the protruding structure 11 or the recessed structure 21, or the same connector may have the protruding structure 11 and the recessed structure 21 on different surfaces, and any combination thereof may be possible, depending on the design of connectors of different assembled toys.

With reference to FIGS. 1-4, in some embodiments, the first wavy step 111 and the second wavy step 211 have peaks 3 and troughs 4 and slopes 5 between the peaks 3 and the troughs 4. Each of the slopes 5 is between each of the peaks 3 and the trough 4 adjacent thereto. When the first connector 1 is connected to the second connector 2, the peaks 3 of the first wavy step 111 are aligned with the troughs 4 of the second wavy step 211, and the slope has an angle ranging from 30 to 60, such that effort-saving is maintained while axial lengths of the protruding structure 11 and the recessed structure 21 are not excessively long or short, enabling the overall dimension of the connectors to be balanced.

With reference to FIGS. 1-4, in some embodiments, there are smooth surface transitions between the peaks 3 and the troughs 4, making separation smoother.

With reference to FIGS. 1-4, in some embodiments, the first wavy step 111 is uniformly distributed around a circumference of an outer surface of the protruding structure 11, forming a continuous wavy structure; and the second wavy step 211 is uniformly distributed around a circumference of an inner surface of the recessed structure 21, forming a continuous wavy structure, so the first connector 1 and the second connector 2 are not limited to a connection in one direction, and one of the peaks 3 of the first wavy step 111 may freely mate with any one of the troughs 4 of the second wavy step 211.

With reference to FIGS. 1-4, in some embodiments, the first wavy step 111 and the second wavy step 211 have equal thicknesses in a horizontal direction, that is, a vertical distance from an outer surface of the first wavy step 111 to an intersection plane between the first wavy step 111 and the protruding structure 11 is equal to a vertical distance from an outer surface of the second wavy step 211 to an intersection plane between the second wavy step 211 and the recessed structure 21, such that the contact surface of the first wavy step 111 completely fits with the contact surface of the second wavy step 211 when the first wavy step 111 mates with the second wavy step 211. This results in dimensional uniformity of connecting structures of different connectors, and different connectors can be designed as needed to enrich the assembly forms of the assembled toy.

With reference to FIGS. 1-5, in some embodiments, a recess 112 is provided at the top of the protruding structure 11 corresponding to an axial direction, and at least two split fins 113 extend inwardly from the recess 112. A protrusion 212 mating with the recess 112 is provided at the bottom of the recessed structure 21 corresponding to the axial direction, a boss 2121 is provided on an outer side of the protrusion 212, and the boss 2121 can be engaged with the fins 113 such that the first connector 1 and the second connector 2 are fixed to each other. The boss 2121 is engaged with edges of the fins 113, such that the first connector 1 and the second connector 2 can be firmly locked to each other.

With reference to FIGS. 1-5, in some embodiments, ends of the at least two fins 113 away from the recess 112 are gathered close to each other, and the boss 2121 causes the fins 113 to deform and move away from each other when the protrusion 212 is inserted into the recess 112. When the boss 2121 passes over the fins 113, the fins 113 return to their original shapes, and the edges of the fins 113 are engaged with the boss 2121. With the characteristic of elastic deformation of the plurality of fins 113, one-way engagement is achieved between the fins 113 and the protrusion 212, such that the first connector 1 and the second connector 2 can be easily and effortlessly connected and are difficult to separate.

With reference to FIGS. 1-5, in some embodiments, a head of the protrusion 212 is provided with a guide bevel 2122. Such a design allows the guide bevel 2122 to slide relative to the fins 113 during connection, thereby reducing frictions and enabling smoother and more effortless interconnection between the first connector 1 and the second connector 2.

Figure 3:
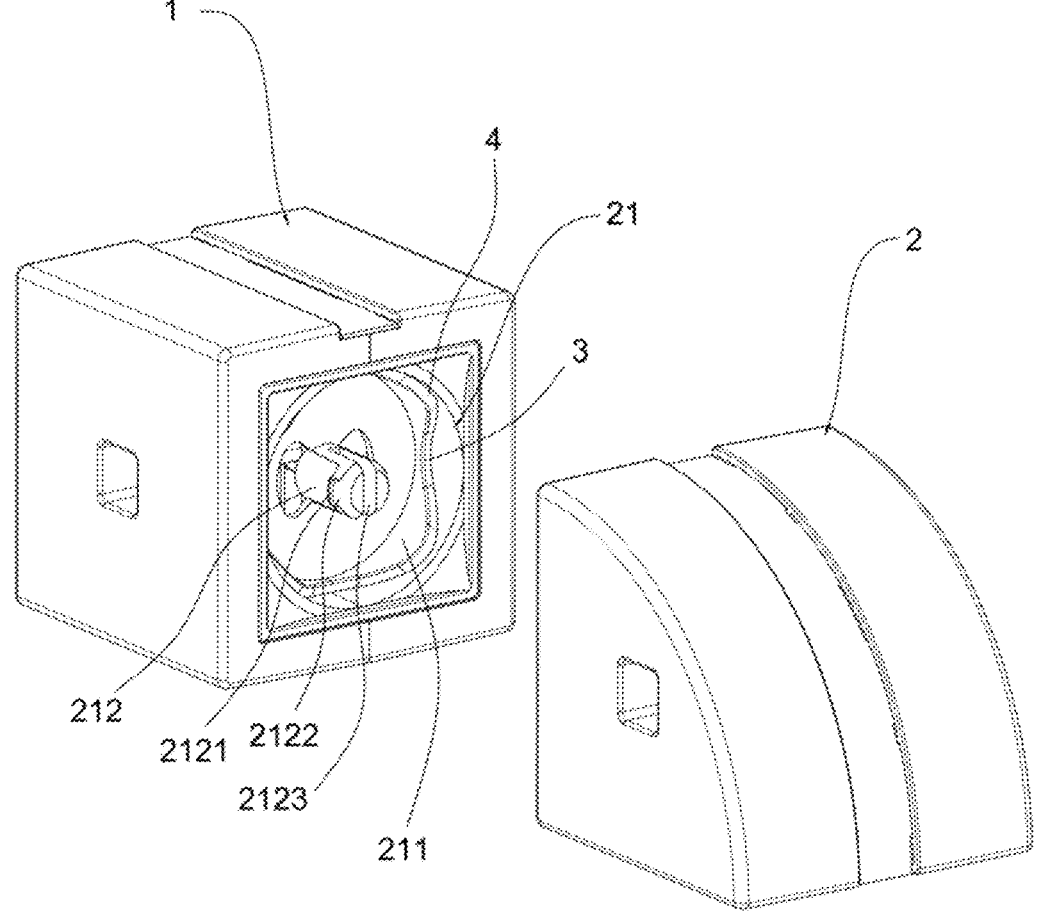
FIG. 3 shows a perspective view of the assembled toy in FIG. 2 from another perspective.
Figure 4:
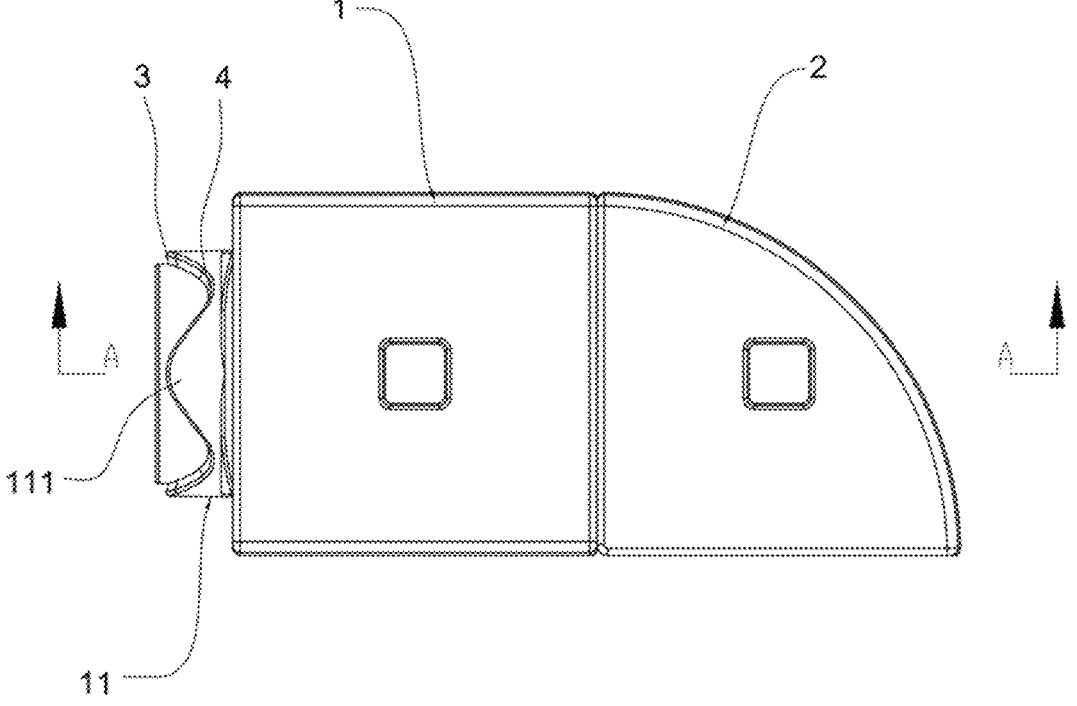
FIG. 4 shows a front view of the assembled toy shown in FIG. 1.
Figure 5:
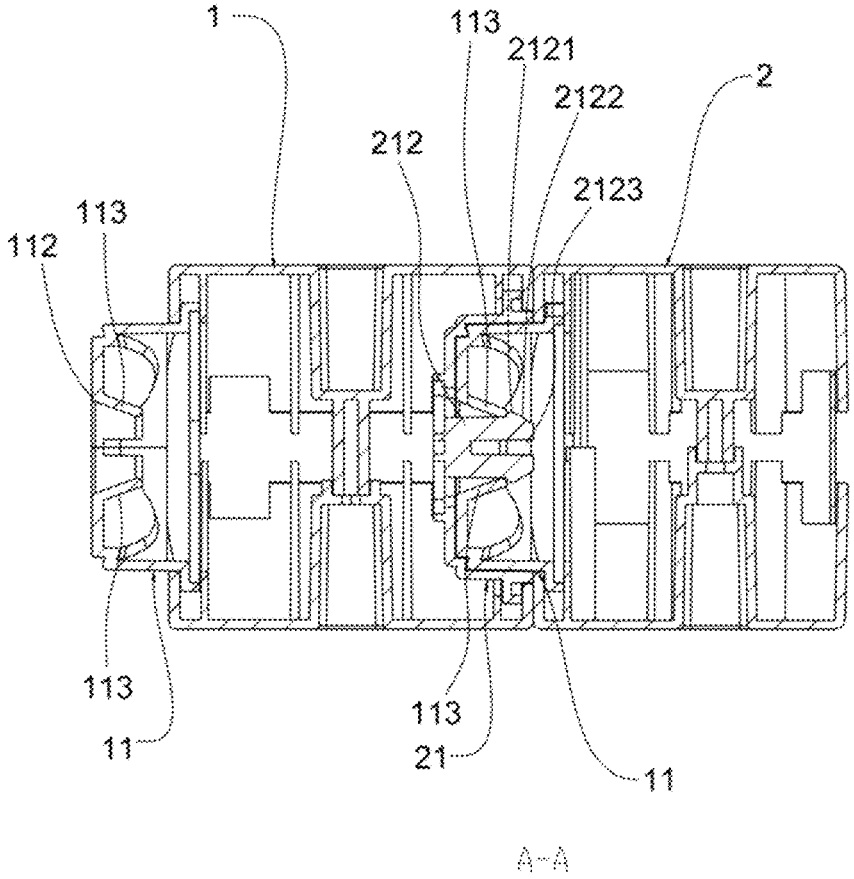
FIG. 5 shows a sectional view along line A-A of FIG. 4.

With reference to FIGS. 3 and 5, in some embodiments, the head of the protrusion 212 is provided with a notch 2123, and the notch 2123 becomes smaller and the protrusion 212 deforms toward an axial center when the notch is subjected to an compressive force. The first connector 1 and the second connector 2 can be connected and locked to each other even if a small force is applied, such that children with limited strength can also operate effortlessly.

With reference to FIGS. 1-5, in some embodiments, the first connector 1 and the second connector 2 are made of a plastic material, preferably ABS (acrylonitrile-butadiene-styrene copolymer) or PA (polyamide, commonly known as nylon) material. The ABS material is easy to process, has high material hardness and good dimensional stability, and is suitable for making assembled toys requiring high-precision mating. The PA material has good wear resistance and high fatigue resistance, and can prolong the service life of the assembled toy.

Based on the design of the wavy steps mating with each other on the protruding structure 11 and the recessed structure 21, the connecting structure according to the present application effectively overcomes the defects of laborious assembly and disassembly for conventional interference-fit connections and of cumbersome operations of a complex locking mechanism. A stable connection can be achieved by direct insertion, ensuring the reliability of an assembled model. Separation operations are carried out by means of rotation. By means of the guiding of the slopes 5 of the wavy steps, children can carry out disassembly easily, and operation difficulty and requirements for a physical force are lowered significantly. The structure can be operated intuitively and easily, which greatly enhances the playability and enjoyment of the toy while ensuring the connection strength.

In the description of the present invention, references to the terms "one embodiment," "some embodiments," "example," "specific example," or "some examples" mean that the described features, structures, materials, or characteristics are included in at least one embodiment or example. Moreover, the described features, structures, materials, or characteristics may be combined in any suitable way in one or more embodiments or examples. Further, unless otherwise contradictory, different embodiments or examples and their features may be combined.

Additionally, the terms "first," "second," etc. are used for descriptive purposes only and should not be construed as indicating relative importance or implying any limitation on the number of features. Features described as "first" or "second" may include one or more such features. In the description of the present invention, the term "plurality" means two or more, unless specifically defined otherwise.

The foregoing are merely specific embodiments of the present invention and do not limit its protection scope. Any person skilled in the art can easily conceive of various modifications or substitutions within the scope of the disclosed technical solution, and these should all fall within the scope of protection of the present invention. Therefore, the scope of protection shall be defined by the appended claims.

What is claimed is:

1. A connecting structure for an assembled toy, comprising a first connector and a second connector, wherein
   the first connector is provided with a protruding structure, a first wavy step being formed on an outer surface of the protruding structure; and
   the second connector is provided with a recessed structure, a second wavy step mating with the first wavy step being formed on an inner surface of the recessed structure;
   wherein the protruding structure and the recessed structure mate with and are locked to each other to achieve a detachable connection between the first connector and the second connector, wherein when the first connector is rotated relative to the second connector, the first wavy step and the second wavy step generate an interaction force to release the locking of the protruding structure and the recessed structure, such that the first connector and the second connector are separated from each other.

2. The connecting structure for the assembled toy according to claim 1, wherein the first wavy step and the second wavy step have peaks and troughs and slopes between the peaks and the troughs, respectively, each of the slopes having an angle of 30° to 60°.

3. The connecting structure for the assembled toy according to claim 2, wherein there is a smooth surface transition between each of the peaks and each of the troughs.

4. The connecting structure for the assembled toy according to claim 1, wherein the first wavy step is uniformly distributed along a circumference of the outer surface of the protruding structure, forming a continuous wavy structure; and the second wavy step is uniformly distributed along a circumference of the inner surface of the recessed structure, forming a continuous wavy structure.

5. The connecting structure for the assembled toy according to claim 4, wherein the first wavy step and the second wavy step have equal thicknesses in a horizontal direction, such that a contact surface of the first wavy step completely fits with a contact surface of the second wavy step when the first wavy step mates with the second wavy step.

6. The connecting structure for the assembled toy according to claim 1, wherein
   a recess is provided at the top of the protruding structure corresponding to an axial direction, at least two split fins extending inwardly from the recess; and
   a protrusion mating with the recess is provided at the bottom of the recessed structure corresponding to the axial direction, a boss is provided on an outer side of the protrusion, and the boss is engaged with the fins such that the first connector and the second connector are fixed to each other.

7. The connecting structure for the assembled toy according to claim 6, wherein ends of the at least two fins away from the recess are gathered close to each other, and the boss causes the fins to deform and move away from each other when the protrusion is inserted into the recess; and when the boss passes over the fins, the fins return to their original shapes, and edges of the fins are engaged with the boss.

8. The connecting structure for the assembled toy according to claim 6, wherein a head of the protrusion is provided with a guide bevel.

9. The connecting structure for the assembled toy according to claim 6, wherein a head of the protrusion is provided with a notch, and the notch becomes smaller and the protrusion deforms toward an axial center when the notch is subjected to a compressive force.

10. The connecting structure for the assembled toy according to claim 1, wherein the first connector and the second connector are made of plastic material.

*     *     *     *     *